United States Patent
Thompson

[11] 3,830,637
[45] Aug. 20, 1974

[54] FLUIDISED BED HYDROGENATION
[75] Inventor: Brian Hoyle Thompson, Harpenden, England
[73] Assignee: British Gas Corporation, London, England
[22] Filed: Mar. 30, 1973
[21] Appl. No.: 346,297

[52] U.S. Cl. .................................. 48/213, 48/93
[51] Int. Cl. ..................... C10k 3/06, C10g 13/18
[58] Field of Search ............ 48/197 R, 213, DIG. 1, 48/199 R, 61, 93, 214, 215

[56] References Cited
UNITED STATES PATENTS
3,025,149   3/1962   Eastman .......................... 48/213 X
3,415,634   12/1968   Dent et al. ........................... 48/213

Primary Examiner—R. E. Serwin
Attorney, Agent, or Firm—Larson, Taylor and Hinds

[57] ABSTRACT

A method of supplying heat to the reactants in a fluidised bed hydrogenator by the combustion of carbonaceous materials found in the hydrogenator and wherein the carbonaceous material is injected with air and/or oxygen into a combustion chamber and the products of combustion are supplied to the hydrogenator vessel to provide additional heat to the reactants. The combustion products are supplied to a position within a central rise or risers in the fluidised bed.

5 Claims, 1 Drawing Figure

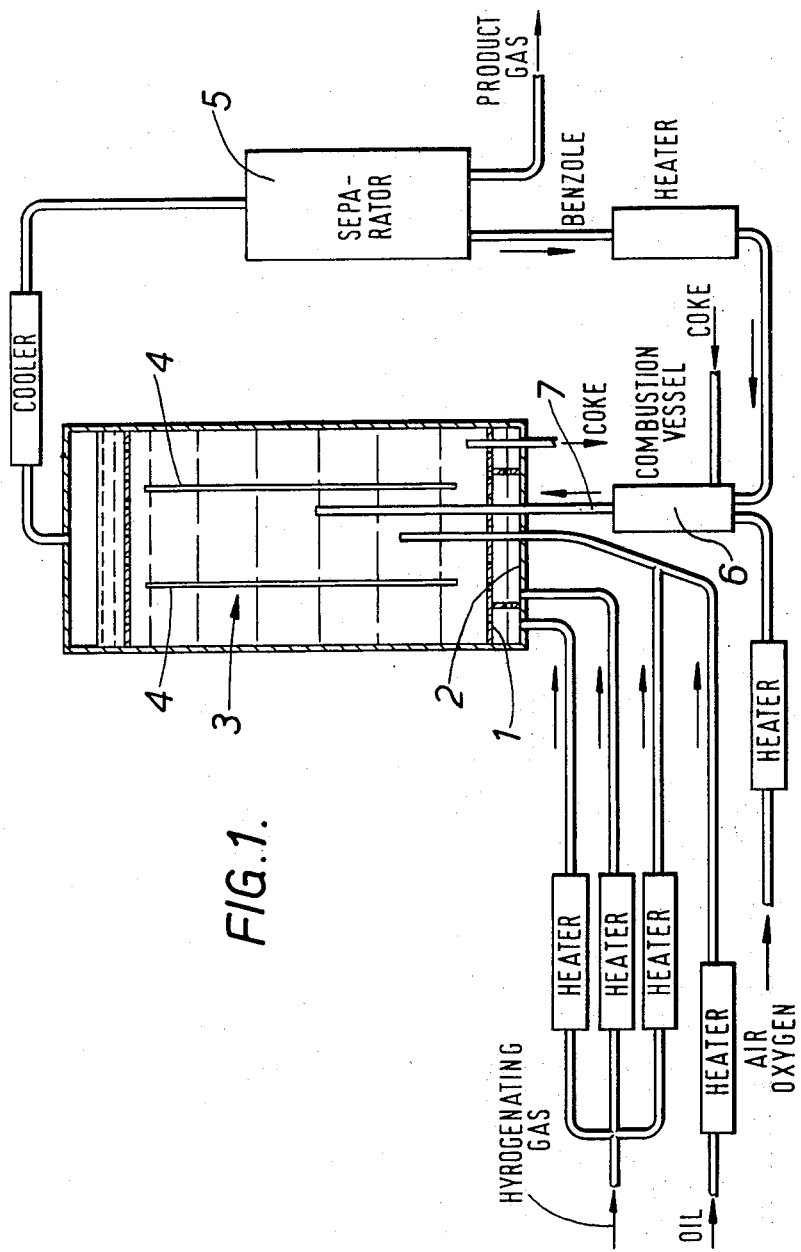

FLUIDISED BED HYDROGENATION

BACKGROUND OF THE INVENTION

This invention relates to a process for the hydrogenation of hydrocarbon oils and is particularly concerned with a process in which a fluidised bed is operated within the reaction vessel.

It is the known practice when operating a non-catalytic fluidised bed process for the hydrogenation of hydrocarbon oils (such as described in our British Patent No 1154321) to provide heat to maintain the reaction temperature by preheating the reactants. However, there are practical limits to which the temperature of the reactants can be raised by means of an indirectly fired preheater.

It is therefore an object of the present invention to provide additional heat into the reactants in a fluidised bed hydrogenator.

SUMMARY OF THE INVENTION

According to the invention, there is provided a method of supplying heat to the reactants in a fluidised bed hydrogenator by the combustion of carbonaceous materials formed in the hydrogenator.

Although heat can be supplied to the reactants by the controlled admission of air or oxygen into the reaction vessel there is a serious disadvantage to such a method as some of the feedstock and/or desirable products of the process may well be oxidised. In order to avoid the destruction of these materials a combustion chamber is therefore included either as an integral part of the reaction vessel or as a separate unit.

BRIEF DESCRIPTION OF THE DRAWING

To enable the invention to be more clearly understood and solely by way of example, one process is described with the aid of FIG. 1, which is a flow diagram of the said process.

DESCRIPTION OF THE PREFERRED EMBODIMENT

In operation preheated hydrogen is passed at elevated pressure through a distributor 1 at the lower end of the reaction vessel 2 to maintain a bed of particles 3 in a fluidised state within the vessel, and a further quantity of hydrogen together with a preheated fluid reactant is injected or atomised into a large diameter riser 4 within the fluidised bed. The reaction products are continuously withdrawn from the top of the reaction vessel and fed into a separation plant 5 where on cooling the liquefied products are removed from the gaseous compounds. The least valuable product which is usually the heavy liquid fraction is then separated from the valuable products and is used as a fuel for a combustion chamber 6. This chamber consists of a pressure vessel which may be refractory lined into which the least desirable products from the reaction are injected under pressure into a suitable burner arrangement for burning the said liquid. Air or oxygen is also introduced into the chamber for the combustion to be initiated. The combustion products are passed into the reaction vessel by means of a pipe 7 which enters at the lower part of the vessel and terminates within the central riser or risers of the fluidised bed. This is preferably approximately half way up the riser tube but if it is desirable not to decrease the partial pressure of the reactants near the inlet to the fluidised bed then the combustion products should be admitted at a higher position in the bed and the pipe from the combustion chamber should be made to terminate at a higher position in the reaction vessel.

In a reactor operating in accordance with the invention the following results were obtained and are compared with results from a reaction using the known method of air addition to heat the reactants in the vessel. It will be seen that the Thermal output is enhanced when using the invention.

| Hydrogenating Gas | | |
|---|---|---|
| Rate (Ft$^3$/hr) | | 34,980 |
| Composition (% wt) | | |
| $CO_2$ | 0.3 | |
| $H_2$ | 94.0 | |
| CO | 3.3 | |
| $CH_4$ | 1.7 | |
| $N_2$ | 0.7 | |
| Oil/Hydrogenating Gas (gals/1000 cu ft) | | 4.51 |
| Air addition (ft$^3$/hr) | | 2160 |

| Rich Gas Analysis (% vol) | | 2. Sidestream Combustion Products | |
|---|---|---|---|
| 1. Direct Air addition to FBH | | Addition to FBH | |
| CO | 3.04 | CO | 3.02 |
| $CO_2$ | 0.41 | $CO_2$ | 1.26 |
| $N_2$ | 5.34 | $N_2$ | 5.20 |
| $H_2$ | 31.30 | $H_2$ | 32.22 |
| $CH_4$ | 45.53 | $CH_4$ | 44.31 |
| $C_2H_6$ | 13.99 | $C_2H_6$ | 13.61 |
| CxHy | 0.39 | CxHy | 0.38 |
| Calorific Value | (Btu's / ft$^3$) | Calorific Value | (Btu's /ft$^3$) |
| As Made | 812 | As made | 796 |
| Inerts Free | 861 | Inerts Free | 850 |
| Thermal Output | (Therms/hr) 295.71 | Thermal Output | (Therms/hr) 299.41 |

For the case of direct air addition to the fluidised bed hydrogenator, it was assumed that only the hydrogenating gas was burnt and so the combustion products are mainly water which does not affect the rich gas composition. However since hydrogen is burnt the rich gas rate is less than that for the case of sidestream combustion products addition and the thermal output is therefore less.

In the example using the addition of sidestream combustion products the rich gas contains more $CO_2$ and therefore the 'as made' calorific value of the gas is less than for the direct air addition to the FBH.

If so desired any carbonaceous products which have built up on the particles forming the fluidised bed can be used as a source of fuel in place of the reaction products mentioned above. The original fluidised bed may consist of inert mineral or carbonaceous particles. Particles removed from the reaction vessel, preferably the larger particles are fed to a suitable burner in the combustion chamber in place of at least part of the liquid. There is a further advantage when burning such coke products that fine inert material is re-introduced into the reaction vessel. If inert particles have the carbon which was deposited during the hydrogenation reactions burnt off or if the particles of carbon are partially combusted thereby making them smaller this helps to maintain good quality of fluidisation in the bed.

It should also be mentioned that the choice of using air or oxygen will depend on whether the amount of nitrogen from the air which would be admitted into the fluidised bed has any serious effect on the reaction process.

What we claim is:

1. A method of supplying heat to the reactants in a fluidised bed hydrogenator by the combustion of carbonaceous materials found in the hydrogenator and wherein the carbonaceous material is injected with air and/or oxygen into a combustion chamber and the products of combustion are supplied to the hydrogenator vessel to provide additional heat to the reactants.

2. A method according to claim 1 wherein the combustion products are supplied to a position within a central riser or risers in the fluidised bed.

3. A method according claim 2 wherein the combustion products are supplied to a position to at least halfway up the risers.

4. A method according claim 2 wherein the carbonaceous material is a heavy liquid fraction separated from the product gases leaving the hydrogenator vessel.

5. A method according claim 2 wherein the particles forming the fluidised bed are withdrawn from the hydrogenator vessel and the residual coatings deposited on the particles during the hydrogenator reaction is combusted to provide the additional heat.

* * * * *